United States Patent [19]

Shiino et al.

[11] Patent Number: 5,629,352

[45] Date of Patent: May 13, 1997

[54] SOLVENT FOR POLYSTYRENE, METHOD FOR REDUCING VOLUME OF POLYSTYRENE FOAM AND METHOD FOR RECYCLING POLYSTYRENE FOAM

[75] Inventors: Toru Shiino, Moriguchi; Kenichi Nobuta, Ikoma; Hiroshi Onishi, Hirakata, all of Japan

[73] Assignee: Matsushita Electric Industrial Co., Ltd., Osaka, Japan

[21] Appl. No.: 632,820

[22] Filed: Apr. 16, 1996

[30] Foreign Application Priority Data

Apr. 24, 1995 [JP] Japan ................................ 7-098838
May 10, 1995 [JP] Japan ................................ 7-112165

[51] Int. Cl.⁶ .................................................. C08J 11/04
[52] U.S. Cl. ........................... 521/40.5; 521/47; 521/146
[58] Field of Search ............................ 521/40.5, 47, 146

[56] References Cited

U.S. PATENT DOCUMENTS

| | | | |
|---|---|---|---|
| 4,517,312 | 5/1985 | Kumasaka et al. | 521/45 |
| 5,147,894 | 9/1992 | Bopp et al. | 521/40.5 |
| 5,269,948 | 12/1993 | Krutchen | 521/47 |
| 5,300,267 | 4/1994 | Moore | 521/47 |
| 5,443,769 | 8/1995 | Karabedian et al. | 264/46.1 |

FOREIGN PATENT DOCUMENTS 7-145261  6/1995  Japan .

*Primary Examiner*—Morton Foelak
*Attorney, Agent, or Firm*—Panitch Schwarze Jacobs & Nadel, P.C.

[57] ABSTRACT

A solvent for polystyrene, having an excellent dissolving ability and chemical stability with no influence on the operating environment, is disclosed. A relatively simple recycling or reutilizing process of both the polystyrene foam and the solvent is also disclosed. The solvent comprises at least one member selected from the group consisting of such a glycol ether compound as diethylene glycol dimethyl ether, diethylene glycol diethyl ether or dipropylene glycol dimethyl ether, and such a fatty acid dialkyl ester compound as dimethyl succinate, dimethyl glutarate or dimethyl adipate. These compounds have a flash point of 100° C. or higher, and can be made nonflammable by addition of water.

8 Claims, No Drawings

SOLVENT FOR POLYSTYRENE, METHOD FOR REDUCING VOLUME OF POLYSTYRENE FOAM AND METHOD FOR RECYCLING POLYSTYRENE FOAM

BACKGROUND OF THE INVENTION

1. Field of the Invention

The present invention relates to a solvent enabling reduction in the volume and recycling of polystyrene foam or expanded polystyrene, and, in particular, to a method for recycling polystyrene foam materials.

2. Description of the Prior Art

In recent years, it is desired, from the view point of waste-disposal, to establish a recycling technology of the polystyrene foam used as a buffer or shock-absorber material.

Disposal of the polystyrene foam has hitherto been performed by heat-treatment in general. The reduction of the volume of the polystyrene foam by the heat-treatment however suffers from a disadvantage that the physical property of the polystyrene material is deteriorated by the applied heat and the resultant contraction of the material.

Researches on new methods for recycling the polystyrene foam by means of dissolution are being made for replacing the heat-treatment, because the new methods are considered to have a relatively small influence on the deterioration of the physical property of the material. At present, it is proposed to use d-limonene, which is one of citrus plant essential oils, as a solvent for the dissolution method.

The solvent, d-limonene, used in the above-mentioned dissolution method has an excellent ability for dissolving the polystyrene foam. The d-limonene however has a disadvantage that it has a strong citrus odor and a low flash point of 47° C., and thus influences an operating environment. It is also liable to decompose and lacks stability, because it is a natural product.

SUMMARY OF THE INVENTION

The present invention is proposed in order to overcome the above-mentioned disadvantages of the prior art. The object of the present invention is to provide a solvent for polystyrene having an excellent dissolving ability and an excellent chemical stability, with no influence on the operating environment.

Another object of the present invention is to provide a method for reducing the volume of the polystyrene foam with the use of the above-mentioned solvent.

Still another object of the present invention is to provide a method for recycling the polystyrene foam with the use of the above-mentioned solvent.

The present invention provides a solvent for polystyrene comprising as its main ingredient at least one member selected from the group consisting of a glycol ether compound represented by the general formula (1)

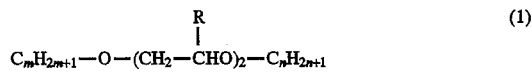

where m represents an integer of 1–4, n represents an integer of 0–4, and R represents a hydrogen atom or a methyl group, and a fatty acid dialkyl ester compound represented by the general formula (2)

where $R_1$ and $R_2$ each represents an alkyl group having 1–3 carbon atoms, and n represents an integer of 0–4.

As the above-mentioned glycol ether compound, it is preferable to use at least one member selected from the group consisting of diethylene glycol dimethyl ether, diethylene glycol diethyl ether and dipropylene glycol dimethyl ether.

In a preferred embodiment of the present invention, the above-mentioned solvent is selected from glycol ether compounds having a flash point of 100° C. or higher. The solvent is further added with water.

As the above-mentioned fatty acid dialkyl ester compound, it is preferable to use a fatty acid dimethyl ester compound, in particular, dimethyl succinate, dimethyl glutarate or dimethyl adipate, In a preferred embodiment of the present invention, the solvent is the above-mentioned fatty acid dialkyl ester compound, with an addition of water.

A method for recycling the polystyrene foam in accordance with the present invention comprises the steps of dissolving the polystyrene foam in the above-mentioned solvent, and distilling the obtained solution at a temperature at which polystyrene does not decompose, thereby to separate the above-mentioned solvent from the polystyrene.

Another method for recycling the polystyrene foam in accordance with the present invention comprises the steps of dissolving the polystyrene foam in the above-mentioned solvent, precipitating polystyrene from the obtained solution by adding water to the solution, and separating the polystyrene from the solution.

Still another method for recycling the polystyrene foam in accordance with the present invention comprises the steps of dissolving the polystyrene foam in the above-mentioned solvent, precipitating polystyrene from the obtained solution by cooling the solution to a temperature lower than the temperature at which polystyrene dissolves, and separating the polystyrene from the solution.

In the above-mentioned method for recycling the polystyrene foam, it is preferable to perform a filtrating process for separating the precipitated polystyrene from the solution.

The present invention also provides a method for recycling the polystyrene foam, wherein the above-mentioned solvent is regenerated by distillation and used again as the solvent for the polystyrene foam.

While novel features of the invention are set forth particularly in the appended claims, the invention, both as to organization and content, will be better understood and appreciated, along with other objects and features thereof, from the following detailed description taken in conjunction with the preferred embodiments.

DETAILED DESCRIPTION OF THE PREFERRED EMBODIMENTS

The glycol ether compounds represented by the above-mentioned formula (1), wherein the alkyl groups represented by $C_mH_{2m+1}$ and $C_nH_{2n+1}$ are any of methyl group, ethyl group, propyl group, isopropyl group, butyl group, isobutyl group and tert-butyl group, can be exemplified as diethylene glycol monoalkyl ether, dipropylene glycol monoalkyl ether, diethylene glycol dialkyl ether and dipropylene glycol dialkyl ether. In the above-mentioned dialkyl ether compounds, the two alkyl groups may be the same or may be different from each other.

Since the ability of the solvent to dissolve polystyrene increases with increase in the Concentration of these glycol ether compounds in the solvent, it is most desirable to configure the solvent only with the glycol ether compounds represented by the above-mentioned formula (1).

On the other hand, the fatty acid dialkyl ester compounds represented by the above-mentioned formula (2), wherein the alkyl groups represented by $R_1$ and $R_2$ are any of methyl group, ethyl group, propyl group, iso-propyl group and butyl group, and n indicating the number of the methylene group is in a range of 0–4, can be exemplified as dialkyl esters of oxalic acid, malonic acid, succinic acid, glutaric acid and adipic acid. In the above-mentioned dialkyl ester compounds, the two alkyl groups may be the same or may be different from each other.

Since the ability of the solvent to dissolve polystyrene increases with increase in the concentration of these fatty acid dialkyl ester compounds in the solvent, it is most desirable to configure the solvent only with the fatty acid dialkyl ester compounds represented by the above-mentioned formula (2).

Although depending on the compound constituting the solvent in accordance with the present invention, the ability of the solvent to dissolve polystyrene increases in general if the solvent is heated and the dissolving process proceeds more smoothly, accordingly. The temperature required for dissolving polystyrene in the solvent in accordance with the present invention is usually in a range from room temperature to 70° C. In order to promote the dissolving process, any physical means such as ultrasonic radiation or stirring may be added to the process.

It is desirable that the solvent contains diethylene glycol dimethyl ether, diethylene glycol diethyl ether or dipropylene glycol dimethyl ether among the glycol ether compounds represented by the formula (1), because the ability of the solvent to dissolve polystyrene further increases if these compounds are incorporated. It is most desirable to use diethylene glycol dimethyl ether because it can dissolve polystyrene on the spot even at room temperature.

In the glycol ether compounds represented by the above-mentioned formula (1), if the number of m and n of the alkyl groups represented by $C_mH_{2m+1}$ and $C_nH_{2n+1}$ exceeds 4, the ability to dissolve polystyrene becomes poor.

If the additional mole number of the oxyethylene or oxypropylene represented by the formula (3)

$$-(CH_2-CHO)-\quad\overset{R}{|}\qquad(3)$$

where R represents a hydrogen atom or a methyl group, is 1, the glycol ether compound has a toxicity and a low flash point, and thus is not suitable from the viewpoint of preserving the operating environment. On the other hand, if the additional mole number is 3 or more, the compound has a poor ability to dissolve polystyrene and is not preferable as the solvent.

Among the fatty acid dialkyl ester compounds represented by the formula (2), fatty acid dimethyl ester compounds whose alkyl groups represented by $R_1$ and $R_2$ are methyl group increases the ability of the solvent to dissolve polystyrene, and thus is desirable as the solvent. It is further most desirable to use dimethyl succinate, dimethyl glutarate and dimethyl adipate with an n value indicating the number of the methylene group in a range of 2–4, because they can dissolve polystyrene even at room temperature.

In the fatty acid dialkyl ester compounds represented by the above-mentioned formula (2), if the number of carbon atoms in the alkyl groups represented by $R_1$ and $R_2$ exceeds 3, the ability of the solvent to dissolve polystyrene becomes poor.

Further, if n indicating the number of the methylene group exceeds 4, the ability of the solvent to dissolve polystyrene becomes poor.

If the polystyrene foam is dissolved in the solvent containing the above-defined glycol ether compounds and/or fatty acid dialkyl ester compounds and then the obtained solution is distilled, it is possible to separate polystyrene from the solvent. In this case, it is more desirable to perform the distillation under reduced pressure so that the calorimetric value required for the separation becomes low.

For instance, in the case of using diethylene glycol dimethyl ether (boiling point: 169° C.) as the solvent, it is required to perform the distillation process by heating the solution at 169° C. or higher under atmospheric pressure. Under reduced pressure of 20 mmHg, the boiling point of the diethylene glycol dimethyl ether becomes 63° C. and thus the distillation process can be performed by heating the solution only at 63° C. or higher.

Further, in the case of using diethyl succinate (boiling point: 211° C./760 mmHg) as the solvent, it is required to perform the distillation process by heating the solution at 211° C. or higher under atmospheric pressure. Under reduced pressure of 20 mmHg, the boiling point becomes 111° C. and thus the distillation process can be performed by heating the solution only at 111° C. or higher.

If the polystyrene foam is dissolved in the solvent containing the above-defined glycol ether compounds and/or fatty acid dialkyl ester compounds and then water is added to the obtained solution, it is possible to easily precipitate polystyrene again from the solvent. Although the amount of water required for the precipitation varies with the composition, it is usually in a range of 10–50 parts by weight for 100 parts by weight of the solvent which dissolves polystyrene.

In addition, polystyrene may alternatively be precipitated by lowering the temperature of the solvent which dissolves a saturating amount of polystyrene.

For instance, in the case of using diethylene glycol monoethyl ether which can dissolve polystyrene at 70° C. but has only a scarce dissolving ability at room temperature, polystyrene tends to precipitate when the solution containing polystyrene is stood still and cooled to room temperature. In another case of using dipropyl adipate which can dissolve polystyrene at 70° C. but has only a scarce dissolving ability at room temperature, polystyrene tends to precipitate when the solution containing polystyrene is stood still and cooled to room temperature.

According to these methods, since the precipitated polystyrene tends to float on the solvent, it is possible to separate polystyrene from the solvent by simply scooping it from the liquid phase but it is also possible to perform a filtration process if necessary. After the precipitated polystyrene is removed by filtrating off from the liquid phase, it is possible to recover the solvent to use it again by removing water from the solvent by distillation. This: manner of separation requires a less calorimetric value than the method of separation by distilling the solvent which dissolves polystyrene and thus is considered to be more preferable as a recycling method.

Among the glycol ether compounds represented by the above-mentioned formula (1), monoalkyl ethers wherein the alkyl groups represented by $C_mH_{2m+1}$ are any of butyl group, isobutyl group and tert-butyl group have a flash point of 100° C. or higher. By adding water to these glycol ether compounds, they can be made nonflammable. Further, among the fatty acid dialkyl ester compounds represented by the general formula (2), esters of succinic acid, glutaric acid and adipic acid whose number of the methylene group is 2 or more have a flash point of 100° C. or higher. By adding water to these esters, they can be made nonflammable.

The amount of water required for making the solvent nonflammable is at least 3% by weight and, more preferably, 5% by weight or more for securing safety in the operation. By making the solvent nonflammable, it is possible to reduce the volume of the polystyrene foam at recycling factries where the nonflammable solvent is more preferable.

In addition, the glycol ether compounds and fatty acid dialkyl ester compounds in accordance with the present invention are thermally stable and thus it is possible to use the solvent repeatedly.

According to the present: invention, it is possible to provide a solvent for polystyrene having an excellent dissolving ability and stability with no influence on the operating environment. It is also possible to realize a relatively simple recycling process of both the polystyrene foam and the solvent for polystyrene by precipitation of polystyrene by distillation or addition of water.

In the following, the descriptions for Examples 1–11 will focus on a solvent constituted only with the glycol ether compounds, and the descriptions for Examples 12–21 will focus on a solvent constituted only with the fatty acid dialkyl ester compounds, respectively. Various additives may be added to the solvent unless the recycling method in accordance with the present invention is damaged. As an additive for the glycol ether compounds, there may be exemplified any glycol ethers other than the glycol ether compounds represented by the formula (1), water, aliphatic alcohols, aliphatic ketones, glycols, hydrocarbons and various surfactants. Further, as an additive for the fatty acid dialkyl ester compounds, there may be exemplified any aliphatic esters other than the fatty acid dialkyl ester compounds represented by the formula (2), glycol ethers, water, aliphatic alcohols, aliphatic ketones, glycols, hydrocarbons and various surfactants.

In the following paragraphs, the present invention will be described more specifically with reference to its specific examples.

EXAMPLES 1–7, COMPARATIVE EXAMPLES 1–2

Table 1 and Table 2 below summarize compositions of the solvents to be used in Examples 1–7 and Comparative Examples 1–2, respectively. Numerals in these tables represent ingredients in the compositions in percent by weight.

TABLE 1

| Classification | 1 | 2 | 3 | 4 | 5 | 6 | 7 | 8 | 9 |
|---|---|---|---|---|---|---|---|---|---|
| Example 1 | 70 | | | 30 | | | | | |
| Example 2 | | 100 | | | | | | | |
| Example 3 | | | 50 | | 50 | | | | |
| Example 4 | | | | | | 100 | | | |
| Example 5 | | 50 | | | | | 50 | | |
| Example 6 | | | | 70 | | | | 30 | |
| Example 7 | | | | | | | | | 100 |

TABLE 2

| Classification | 10 | 11 |
|---|---|---|
| Comparative Example 1 | 100 | |
| Comparative Example 2 | | 100 |

Each of the glycol ether compounds indicated by numerals 1–11 in Table 1 and Table 2 represents the following compounds:

1: diethylene glycol monomethyl ether
2: diethylene glycol monoisobutyl ether
3: diethylene glycol monobutyl ether
4: dipropylene glycol monomethyl ether
5: dipropylene glycol monobutyl ether
6: diethylene glycol dimethyl ether
7: diethylene glycol diethyl ether
8: dipropylene glycol dimethyl ether
9: diethylene glycol ethylmethyl ether
10: diethylene glycol monopentyl ether
11: triethylene glycol monoethyl ether A cube of polystyrene foam (length: 5 cm, width: 5 cm, height: 5 cm) was immersed in each 1,000 ml of the solvents listed in Table 1 and Table 2 above, and the temperature and the time period when the cube was dissolved in the solvent were measured. The results of the measurements are summarized in Table 3 below.

TABLE 3

| | Examples 1–3 | Example 4 | Examples 5–7 | Comparative Examples 1–2 |
|---|---|---|---|---|
| Result | Δ | ⊙ | ○ | x |

Symbols for evaluation criteria

⊙: Dissolved in 10 minutes at room temperature.
○: Dissolved in 1 hour at room temperature.
Δ: Dissolved in 1 hour at 70° C.
x: Not dissolved in 1 hour at 70° C.

As clearly shown by the above-mentioned Examples 1–7, the solvents in accordance with the present invention have an excellent ability to dissolve the polystyrene foam.

In contrast to this, the solvents in accordance with Comparative Examples are not suitable for the following reasons.

Comparative Example 1: The solvent, diethylene glycol monopentyl ether, has an alkyl group $C_mH_{2m+1}$ in the formula (1) having 5 or more carbon atoms, and has a remarkably poor ability to dissolve the polystyrene foam.

Comparative Example 2: The solvent, triethylene glycol monoethyl ether, has an additional mole number of 3 or more for oxyethylene or oxypropylene as shown in the general formula (3), and has a remarkably poor ability to dissolve the polystyrene foam.

EXAMPLE 8

In this example, an evaluation was made on the amount of the polystyrene foam which can be dissolved in the solvents in accordance with the present invention.

A hundred (100) g of the polystyrene foam was able to be dissolved in 100 g of dipropylene glycol dimethyl ether. In this manner, the solvent in accordance with the present invention can dissolve a large quantity of the polystyrene foam.

EXAMPLE 9

In this example, a first method for recycling the polystyrene foam in accordance with the present invention will be described.

One (1) L of diethylene glycol dimethyl ether which dissolved the polystyrene foam in 50% by weight was distilled with heat under reduced pressure of 30 mmHg at 70° C. As a result, a pellet of polystyrene was obtained as a residue.

Analysis by gas chromatography on the distillate fraction revealed that it contained diethylene glycol dimethyl ether in 90% by weight or more. If the polystyrene foam was dissolved with this distillate, a solution containing the polystyrene foam in 50% by weight or more was prepared.

EXAMPLE 10

In this example, a second methods for recycling the polystyrene foam in accordance with the present invention will be described.

As a solvent, a mixture of diethylene glycol monoisobutyl ether in 30% by weight and dipropylene glycol dimethyl ether in 70% by weight was used.

When 30 parts by weight of water, was added to 100 parts by weight of the above-mentioned mixed solvent which dissolved the polystyrene foam in 50% by weight, polystyrene was precipitated on upper of the liquid phase. The precipitated polystyrene was filtrated off and removed from the liquid phase, and then the contained water was removed by distillation. If the polystyrene foam was dissolved again with this solvent free from water, a solution containing polystyrene in 50% by weight or more was prepared.

EXAMPLE 11

In this example, a third, method or recycling the polystyrene foam in accordance with the present invention will be described.

As a solvent, a mixture of diethylene glycol monobutyl ether having a flash point of 10° C. or higher and water at 95:5 was used.

Twenty (20) parts by weight of the polystyrene foam was dissolved in 100 parts by weight of the above-mentioned mixed solvent by heating the solvent at 70° C. When this solution was stood still until its temperature dropped to room temperature, polystyrene was precipitated and easily separated from the solvent by scooping it up.

Next, the working examples which use the compounds represented by the formula (2) as their solvents will be described.

EXAMPLES 12-17, COMPARATIVE EXAMPLES 3-4

Table 4 below summarizes compositions of the solvents to be used in Examples 12-17 and Comparative Examples 3-4, respectively. Numerals in She table represent ingredients in the compositions in percent by weight.

TABLE 4

| Classification | 21 | 22 | 23 | 24 | 25 | 26 | 27 | 28 | 29 |
|---|---|---|---|---|---|---|---|---|---|
| Example 12 | 40 | | 60 | | | | | | |
| Example 13 | | 100 | | | | | | | |
| Example 14 | | | 50 | 50 | | | | | |
| Example 15 | | | | | 100 | | | | |
| Example 16 | | | | | | 100 | | | |
| Example 17 | | 25 | 25 | | 50 | | | | |
| Comparative Example 3 | | | | | | | | 100 | |
| Comparative Example 4 | | | | | | | | | 100 |

Each of the fatty acid dialkyl ester compounds indicated by numerals 21-29 in Table 4 represents the following compounds:

21: dimethyl oxalate
22: dimethyl succinate
23: dimethyl adipate
24: dipropyl adipate
25: dimethyl glutarate
26: diethyl malonate
27: diisopropyl succinate
28: dibutyl adipate
29: dimethyl pimelate A cube of polystyrene foam (length: 5 cm, width: 5 cm, height: 5 cm) was immersed in each 1,000 ml of the solvents listed in Table 4 above, and the temperature and the time period when the cube was dissolved in the solvent were measured. The results of the measurements are summarized in Table 5 below.

TABLE 5

| Examples 13, 14, 17 | Examples 12, 15 | Example 16 | Comparative Examples 3-4 |
|---|---|---|---|
| Result ⊚ | o | Δ | x |

Symbols used for evaluation criteria:

⊚: Dissolved in 10 minutes at room temperature.

○: Dissolved in 1 hour at room temperature.

Δ: Dissolved in 1 hour at 70° C., x: Not dissolved in 1 hour at 70° C.

As clearly shown by the above-mentioned Examples 12-17, the solvents in accordance with the present invention have an excellent ability to dissolve the polystyrene foam.

In contrast to this, the solvents in accordance with Comparative Examples are not suitable for the following reasons.

Comparative Example 3: The solvent, dibutyl adipate, has an alkyl group represented by $R_1$ or $R_2$ in the formula (2) having 4 or more carbon atoms, and has a remarkably poor ability to dissolve the polystyrene foam.

Comparative Example 4: The solvent, dimethyl pimelate, has 5 or more methylene groups shown in the formula (2), and has a remarkably poor dissolving ability of the polystyrene foam.

EXAMPLE 18

In this example, an evaluation was made on the amount of the polystyrene foam which can be dissolved in the solvents in accordance with the present invention.

Thirty (30) g of the polystyrene foam was able to be dissolved in 70 g of dimethyl adipate. In this manner, the solvent in accordance with the present invention can dissolve a large quantity of the polystyrene foam.

EXAMPLE 19

In this example, a method for recycling the polystyrene foam in accordance with the present invention will be described.

One (1) L of diethyl succinate which dissolved the polystyrene foam in 20% by weight was distilled under reduced pressure of 20 mmHg at 120° C. for 60 minutes. As a result, a pellet of polystyrene was obtained as a residue.

Analysis by gas chromatography on the distillate fraction revealed that it contained diethyl succinate in 90% by weight or more. If the polystyrene foam was dissolved with this liquid fraction, a solution containing polystyrene in 30% by weight or more is possible.

EXAMPLE 20

In this example, another method for recycling the polystyrene foam in accordance with the present invention will be described.

As a solvent, a mixture of dimethyl glutarate in 30% by weight and dimethyl succinate in 70% by weight was used.

When 30 parts by weight of water was added to 100 parts by weight of the above-mentioned mixed solvent which dissolved the polystyrene foam in 20% by weight, polystyrene was precipitated on the upper of the liquid phase. The precipitated polystyrene was filtrated off and removed from the liquid phase, and then the contained water was removed by distillation. If the polystyrene foam was dissolved again with this solvent free from water, a solution containing polystyrene in 50% by weight or more was prepared.

EXAMPLE 21

In this example, still another method for recycling the polystyrene foam in accordance with the present invention will be described.

As a solvent, a mixture of diethyl succinate having a flash point of 100° C. or higher and water at 95:5 was used.

Ten (10) parts by weight of polystyrene foam was dissolved in 100 parts by weight of the above-mentioned mixed solvent by heating the solvent at 70° C. When this solution was stood still until its temperature dropped to room temperature, polystyrene was precipitated and easily be separated from the solvent by scooping it up.

EXAMPLES 22–28

Table 6 below summarizes compositions of the solvents to be used in Examples 22–28, respectively. Numerals in the table represent ingredients in the compositions in percent by weight.

TABLE 6

| Classification | 31 | 32 | 33 | 34 | 35 | 36 | 37 | 38 | 39 |
|---|---|---|---|---|---|---|---|---|---|
| Example 22 | 50 |    |    |    |    |    | 50 |    |    |
| Example 23 |    | 90 |    |    |    |    |    | 10 |    |
| Example 24 |    |    | 30 |    |    |    |    |    | 70 |
| Example 25 |    |    |    | 20 |    |    | 80 |    |    |
| Example 26 |    |    |    |    | 70 |    |    |    | 30 |
| Example 27 |    |    |    |    |    |    | 50 | 50 |    |
| Example 28 |    |    |    |    | 40 |    |    | 60 |    |

Each of the glycol ether compounds and dialkyl ester compounds indicated by numerals 31–39 in Table 6 represents the following compounds:

Glycol ether compounds:
- 31: diethylene glycol dimethyl ether
- 32: diethylene glycol diethyl ether
- 33: dipropylene glycol dimethyl ether
- 34: diethylene glycol monoethyl ether
- 35: diethylene glycol monoisobutyl ether
- 36: dipropylene glycol monobutyl ether Dialkyl ester compounds::
- 37: dimethyl glutarate
- 38: diethyl succinate
- 39: dibutyl adipate A cube of polystyrene foam (length: 5 cm, width: 5 cm, height: 5 cm) was immersed in each 1,000 ml of the solvents listed in Table 6, and the temperature and the time period when the cube was dissolved in 2the solvent were measured. The results of the measurements are summarized in Table 7 below.

TABLE 7

|  | Examples 22, 23, 25, 27, 28 | Examples 24, 26 |
|---|---|---|
| Result | ⊙ | ○ |

Symbols used as for evaluation criteria:

⊙: Dissolved in 10 minutes at 2room temperature.

○: Dissolved in 1 hour at room temperature.

Δ: Dissolved in 1 hour at 70° C.

x: Not dissolved in 1 hour at 70° C.

As clearly shown by the above-mentioned Examples 22–28, the solvent in accordance with the present invention has an excellent ability to dissolve the polystyrene foam.

EXAMPLE 29

One hundred and twenty (120) cubes (length: 5 cm, width: 5 cm, height: 5 cm) of the polystyrene foam (total volume: 15,000 cm$^3$) were dissolved one by one in 700 ml of dimethyl adipate in a 1,000 ml beaker. When all the cubes were dissolved, the total volume of the solution became 1,000 cm$^3$. Therefore, the volume of the polystyrene foam was reduced to $1/15$ of its initial value by dissolving it in the solvent in accordance with the present invention.

EXAMPLE 30

Polystyrene foam (expanded polystyrene) was dissolved in 18,000 cm$^3$ of diethylene glycol diethyl ether in a volume corresponding to that for packing 20 sets of 28-inch television receivers (total volume: 900,000 cm$^3$). When the polystyrene foam was dissolved, the volume of the solution became 30,000 cm$^3$. Therefore, the volume of the polystyrene foam was reduced to $1/30$ of its initial value by dissolving it in the solvent in accordance with the present invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for recycling polystyrene foam comprising the steps of:

dissolving the polystyrene foam in a solvent which comprises at its main ingredient at least one member selected from the group consisting of a glycol ether compound represented by the general formula (1)

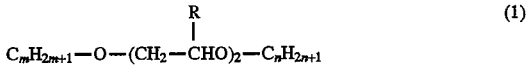

$$C_mH_{2m+1}-O-(CH_2-CHO)_2-C_nH_{2n+1} \quad \overset{R}{|} \quad (1)$$

wherein m represents an integer of 1–4, n represents an integer of 0–4, and R represents a hydrogen atom or a methyl group, and a fatty acid dialkyl ester compound represented by the general formula (2)

$$R_1OOC-(CH_2)_n-COOR_2 \quad (2)$$

wherein $R_1$ and $R_2$ each represents an alkyl group having 1–3 carbon atoms, and n represents an integer of 0–4, and distilling the obtained solution at a temperature at which polystyrene does not decompose, thereby to separate said solvent from polystyrene.

2. A method for recycling polystyrene foam comprising the steps of:

dissolving the polystyrene foam in a solvent which comprises as its main ingredient at least one member selected from the group consisting of a glycol ether compound represented by the general formula (1)

$$C_mH_{2m+1}-O-(CH_2-\overset{R}{\underset{|}{C}HO})_2-C_nH_{2n+1} \quad (1)$$

wherein m represents an integer of 1–4, n represents an integer of 0–4, and R represents a hydrogen atom or a methyl group, and a fatty acid dialkyl ester compound represented by the general formula (2)

$$R_1OOC-(CH_2)_n-COOR_2 \quad (2)$$

wherein $R_1$ and $R_2$ each represents an alkyl group having 1–3 carbon atoms, and n represents an integer of 0–4, precipitating polystyrene from the obtained solution by adding water to the solution, and separating the precipitated polystyrene from said solution.

3. A method for recycling polystyrene foam comprising the steps of:

dissolving the polystyrene foam in a solvent which comprises as its main ingredient at least one member selected from the group consisting of a glycol ether compound represented by the general formula (1)

$$C_mH_{2m+1}-O-(CH_2-\overset{R}{\underset{|}{C}HO})_2-C_nH_{2n+1} \quad (1)$$

wherein m represents an integer of 1–4, n represents an integer of 0–4, and R represents a hydrogen atom or a methyl group, and a fatty acid dialkyl ester compound represented by the general formula (2)

$$R_1OOC-(CH_2)_n-COOR_2 \quad (2)$$

wherein $R_1$ and $R_2$ each represents an alkyl group having 1–3 carbon atoms, and n represents an integer of 0–4, precipitating polystyrene from the obtained solution by cooling the solution to a temperature lower than the temperature at which polystyrene dissolves, and separating the precipitated polystyrene from said solution.

4. The method for recycling polystyrene foam in accordance with claim 1, wherein said solvent is regenerated by distillation and used again as the solvent for the polystyrene foam.

5. The method for recycling polystyrene foam in accordance with claim 2, wherein said solvent is regenerated by distillation and used again as the solvent for the polystyrene foam.

6. The method for recycling polystyrene foam in accordance with claim 3, wherein said solvent is regenerated by distillation and used again as the solvent for the polystyrene foam.

7. A method for recycling polystyrene foam comprising the steps of:

dissolving the polystyrene foam in at least one member selected from the group consisting of diethylene glycol dimethyl ether, diethylene glycol diethyl ether and dipropylene glycol dimethyl ether, precipitating polystyrene from the obtained solution by adding water to the solution, and separating the precipitated polystyrene from said solution.

8. A method for reducing volume of polystyrene foam comprising the step of:

dissolving major portion of the polystyrene foam which is intended to reduce its volume in a solvent which comprises as its main ingredient at least one member selected from the group consisting of a glycol ether compound represented by the general formula (1)

$$C_mH_{2m+1}-O-(CH_2-\overset{R}{\underset{|}{C}HO})_2-C_nH_{2n+1} \quad (1)$$

wherein m represents an integer of 1–4, n represents an integer of 0–4 and R represents a hydrogen atom or a methyl group, and a fatty acid dialkyl ester compound represented by the general formula (2)

$$R_1OOC-(CH_2)_n-COOR_2 \quad (2)$$

wherein $R_1$ and $R_2$ each represents an alkyl group having 1–3 carbon atoms, and n represents an integer of 0–4.

* * * * *